(12) United States Patent
Comb

(10) Patent No.: US 6,814,907 B1
(45) Date of Patent: Nov. 9, 2004

(54) LIQUIFIER PUMP CONTROL IN AN EXTRUSION APPARATUS

(75) Inventor: James W. Comb, Hamel, MN (US)

(73) Assignee: Stratasys, Inc., Eden Prairie, MN (US)

( * ) Notice: Subject to any disclaimer, the term of this patent is extended or adjusted under 35 U.S.C. 154(b) by 416 days.

(21) Appl. No.: 10/025,207

(22) Filed: Dec. 18, 2001

(51) Int. Cl.⁷ .......................... B29C 47/92; B28B 17/00
(52) U.S. Cl. ................... 264/40.07; 264/40.1; 264/308; 425/135; 425/145
(58) Field of Search .............................. 264/40.7, 40.1, 264/308; 425/135, 145

(56) References Cited

U.S. PATENT DOCUMENTS

| | | | |
|---|---|---|---|
| 5,121,329 A | 6/1992 | Crump | 364/468 |
| 5,340,433 A | 8/1994 | Crump | 156/578 |
| 5,900,207 A | 5/1999 | Danforth et al. | 264/603 |
| 6,054,077 A | 4/2000 | Comb et al. | 264/40.7 |
| 6,129,872 A | 10/2000 | Jang | 264/75 |
| 6,547,995 B1 * | 4/2003 | Comb | 264/40.1 |

* cited by examiner

Primary Examiner—Stephen J. Lechert, Jr.
(74) Attorney, Agent, or Firm—Kinney & Lange, P.A.

(57) ABSTRACT

An extrusion apparatus employs a method for controlling the output flow rate of a liquifier. The apparatus includes an extrusion head which moves along a predetermined tool path at an extrusion head velocity. The extrusion head carries a liquifier. The liquifier receives a solid element of a modeling material, heats the modeling material, and outputs a flow of the modeling material at an output flow rate. A material advance mechanism is employed to supply the solid element of modeling material to the liquifier at an input rate which controls the output flow rate. In order to control the output flow rate, an extrusion head velocity profile is determined based on the tool path. The input rate of modeling material to the liquifier is then controlled to produce an output flow rate of modeling material from the liquifier that is proportional to a current extrusion head velocity corresponding to the extrusion head velocity profile.

29 Claims, 4 Drawing Sheets

LIQUIFIER PUMP CONTROL IN AN EXTRUSION APPARATUS

BACKGROUND OF THE INVENTION

This invention relates to the fabrication of three-dimensional objects using extrusion-based layered manufacturing techniques. More particularly, the invention relates to a system and method for supplying solid modeling material to a liquifier carried by an extrusion head at a rate that will generate an output flow rate of the liquifier that relates to a variable velocity of the extrusion head as the modeling material is extruded in a predetermined pattern in three dimensions with respect to a base.

Three-dimensional models are used for functions including aesthetic judgments, proofing a mathematical model, forming hard tooling, studying interference and space allocation, and testing functionality. Extrusion-based layered manufacturing machines build up three-dimensional models by extruding solidifiable modeling material from an extrusion head in a predetermined pattern, based upon design data provided from a computer aided design (CAD) system. Examples of extrusion-based apparatus and methods for making three-dimensional objects are described in Crump U.S. Pat. No. 5,121,329, Crump U.S. Pat. No. 5,340,433, Danforth et al. U.S. Pat. No. 5,738,817, Batchelder et al. U.S. Pat. No. 5,764,521 and Dahlin et al. U.S. Pat. No. 6,022,207, all of which are assigned to Stratasys, Inc., the assignee of the present invention.

A feedstock of either a liquid or solid modeling material is provided to the extrusion head. Where the feedstock of modeling material is in solid form, the extrusion head brings the feedstock to a flowable temperature for deposition. One technique provides the modeling material to the extrusion head in the form of a filament strand.

In the Stratasys FDM® modeling machines of the current art which employ a filament feed, modeling material is loaded into the machine as a flexible filament wound on a supply reel, such as disclosed in U.S. Pat. No. 5,121,329. A solidifiable material which adheres to the previous layer with an adequate bond upon solidification and which can be supplied as a flexible filament is used as the modeling material. Motor-driven feed rollers advance the strand of the filament into a liquifier carried by an extrusion head. Inside the liquifier, the filament is heated to a flowable temperature. Flowable modeling material is forced out of a nozzle on the far end of the liquifier, and deposited from the liquifier onto a base. The motor-driven feed rollers pushing filament into the liquifier create a "liquifier pump," wherein the filament itself serves as the piston. As the feed rollers advance filament into the liquifier, the force of the incoming filament strand extrudes the flowable material out from the nozzle. The flow rate of the material extruded from the nozzle is a function of the rate at which the filament is advanced to the head. The flow rate is commanded by controlling the speed of advancement of filament into the liquifier. A controller controls movement of the extrusion head in a horizontal (x, y) plane, controls movement of the base in a vertical z-direction, and controls the rate at which the feed rollers advance filament. By controlling these processing variables in synchrony, the modeling material is deposited in "beads" layer-by-layer along tool paths defined from the CAD model. The material being extruded fuses to previously deposited material and solidifies to form a three-dimensional object resembling the CAD model.

The extruded material delivered by the liquifier pump has a bead of a cross-sectional area that should ideally be controlled to create an accurate model. Usually, a constant bead width is desired. The bead width is related to the flow rate of material out of the pump as well as the extrusion head velocity. The bead width is also affected by the clearance between the extruding nozzle tip and a previously extruded layer (or the base). If the head velocity were to change while the flow rate were to stay constant, the bead width would vary as well.

One type of rapid prototyping system of the prior art drives the motion of the extrusion head at a constant velocity along a tool path comprising a poly-line. A poly-line is a continuous curve of straight-line segments defined by a list of X-Y coordinate pairs at each vertex. The head velocity is preselected so as to accomplish the general goal of moving the extrusion head quickly along the poly-line while minimizing the displacement from the tool path. As a result, the head velocity must be set slow enough that the deviation from the designated tool path will not exceed the maximum allowable following error for the largest deflection along that poly-line. This type of system is therefore unable to take advantage of the higher head velocities that could be employed along some straighter portions of the poly-line, being limited to the lowest maximum velocity available for any portions of the poly-line having larger deflection angles.

Another type of prototyping system of the prior art allows the extrusion head speed to vary in order to increase the throughput of the modeling machine. The extrusion head speeds up along straight portions in the tool path, and slows down where there are deflection angles or vertices. U.S. Pat. No. 6,054,077 describes one such technique for varying the extrusion head speed, which in an exemplary embodiment uses X-Y trajectory profiling that follows the exponential step response of the liquifier pump. The velocity profile of the extrusion head looks like a "shark tooth," while the pump profile follows a step function.

With any extrusion-based prototyping system, a goal is to extrude liquified modeling material at a rate (known as the output flow rate of the liquifier) that is related to the extrusion head velocity, while also maximizing the extrusion head velocity. A system and method that improves the prototyping system's ability to meet this goal, by controlling the liquifier output flow rate to match a head velocity profile determined according to the shape of the tool path, is the subject of the present invention.

BRIEF SUMMARY OF THE INVENTION

The present invention is an extrusion apparatus employing a method for controlling the output flow rate of a liquifier. The apparatus includes an extrusion head which moves along a predetermined tool path at an extrusion head velocity. The extrusion head carries the liquifier. The liquifier receives a solid element of a modeling material, heats the modeling material, and outputs a flow of the modeling material at an output flow rate. A material advance mechanism is employed to supply the solid element of modeling material to the liquifier at an input rate which controls the output flow rate. In order to control the output flow rate, an extrusion head velocity profile is determined based on the tool path. The input rate of modeling material to the liquifier is then controlled to produce an output flow rate of modeling material from the liquifier that is proportional to a current extrusion head velocity corresponding to the extrusion head velocity profile.

DETAILED DESCRIPTION

The method and apparatus oft he present invention may be employed with respect to an extrusion system which extrudes modeling material from a liquifier pump. Particularly applicable are various types of modeling or prototyping systems which utilize an extrusion head to deposit "roads" of material heated to be flowable, and which material shrinks and solidifies upon a drop in temperature to form a solid model. A preferred material deposition and build-up process is of the type disclosed in U.S. Pat. No. 5,121,329.

Figure 1:
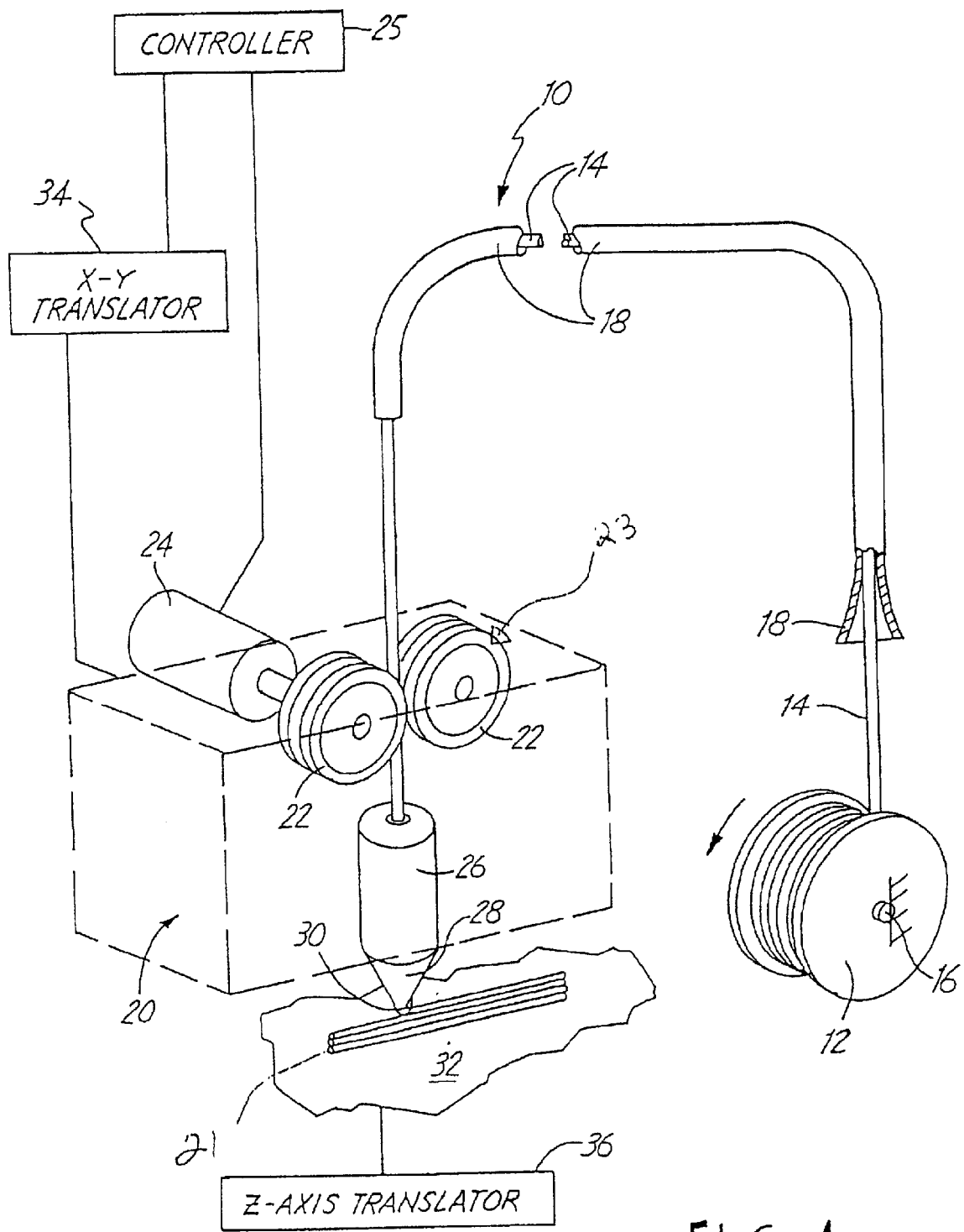
FIG. 1 is a perspective, diagrammatic view of a liquifier pump extrusion apparatus in a three-dimensional modeling machine.

FIG. 1 shows an exemplary three-dimensional modeling machine 10 having an extrusion head 20 which deposits modeling material under the control of a controller 25. The extrusion head 20 carries a liquifier 26 which receives a feed stock of modeling material and heats it to a temperature desired for extrusion. Molten modeling material is deposited from a tip 30 of the liquifier 26 in beads 21 onto a planar base 32 (shown in part). In the preferred embodiment shown, the modeling material feedstock is a flexible filament 14. Typically, the filament has a small diameter, such as on the order of 0.070 inches. A spool 12 carrying a coil of filament 14 is mounted on a spindle 16. A strand of the filament 14 is fed through a guide tube 18, which routes the strand of filament 14 to the extrusion head 20. A material advance mechanism 23 comprised of a pair of feed rollers 22 driven by a motor 24 advances the filament 14 into the liquifier 26 at a controlled rate. Together, the liquifier 26, the filament 14 and the material advance mechanism 23 form a liquifier pump.

The liquifier 26 is pressurized by the "pumping" of the strand of filament 14 into the liquifier 26 by feed rollers 22. The strand of filament 14 acts as a piston. The pressurization impels the molten modeling material out of the tip 30 at an output flow rate (Qo). The volumetric flow rate of liquid material flowing into the pump (Qi) is controlled by adjusting the speed of rotation of the feed rollers 22. As shown, one of feed rollers 22 is a drive roller, driven by the motor 24 under the control of the controller 25. The other roller 22 is an idler roller. The controller 25 controls the pump input flow rate Qi by providing control signals to the motor 24 which drives the rollers 22.

The extrusion head 20 is driven along tool paths in a horizontal (x, y) plane by an x-y translator 34, which receives drive signals from the controller 25 in accordance with design data derived from a CAD model. As the extrusion head 20 is translated in the x, y plane, molten modeling material is controllably dispensed from the tip 30 layer-by-layer onto the base 32. After each layer is dispensed, the base 32 is lowered a predetermined increment along a vertical z-axis by a z-axis translator 36, which also receives drive signals from the controller 25. The dispensed material fuses and solidifies to form a three-dimensional object resembling the CAD model. Modeling material used to build a support structure may be dispensed in a like fashion in coordination with the dispensing of modeling material used to build up the object, to support portions of the object as it is under construction.

As will be understood by those in the art, many variations of the modeling machine and process are possible. For example, any relative movement in three-dimensions between the extrusion head 20 and the base 32 may be used to built up the object. The feedstock of modeling material, the liquifier and the material advance mechanism may take many various forms.

Figure 2A:
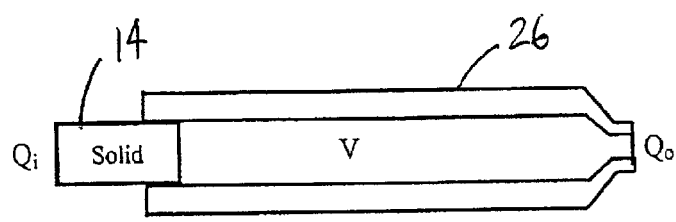
FIG. 2A is a diagram showing a strand of filament being fed to a liquifier at an initial time.
Figure 2B:
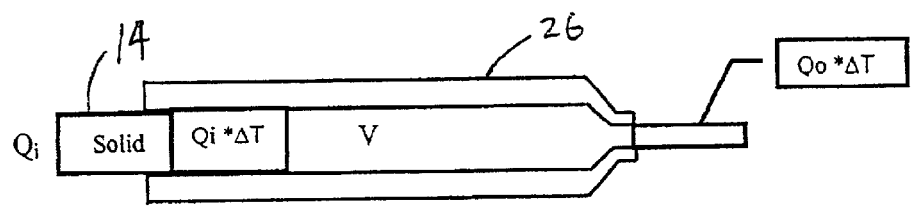
FIG. 2B is a diagram showing the progress of the strand of filament being fed to the liquifier of FIG. 2A a short time after the initial time.

FIGS. 2A and 2B are diagrams illustrating the operation of the liquifier 26. In an exemplary extrusion-based prototyping machine, liquifier 26 is operated in four extrusion phases: pre-pump, acceleration, deceleration and suck-back. The pre-pump phase refers to the initial "charging" period when there is a pre-pump time delay after modeling material is input to the liquifier 26 before any material is extruded from the liquifier 26. The suck-back phase refers to the period when the filament velocity is reversed (sucked back out of the liquifier 26) to prevent excess modeling material from being extruded. FIGS. 2A and 2B, and the accompanying discussion, refer to the actual operating phases of the liquifier 26, which are the acceleration and deceleration phases.

FIG. 2A shows a strand of filament 14 being fed to the liquifier 26 at an initial time, and FIG. 2B shows the progress of the strand of filament 14 a short time ($\Delta t$) later. The liquifier 26 receives the strand of filament 14 at an input flow rate (Qi). The filament 14 is heated to a semi-liquid state and extruded out the tip of the liquifier 26 at an output flow rate (Qo). The liquifier 26 has a fluid volume (V) that changes as the filament 14 is fed into the liquifier tube. FIG. 2B illustrates the change in volume that occurs due to the input and output flow of modeling material. If the input volume (Vi) of solid filament is greater than the output volume (Vo) of flowable material during the time $\Delta t$, the amount of material in the liquifier is increased (or compressed) which increases the material pressure and related output flow. The change in fluid volume ($\Delta V$) of the liquifier 26 can be represented mathematically as follows:

$$\Delta V = Vi - Vo = (Qi)(\Delta t) - (Qo)(\Delta t) = (Qi - Qo)(\Delta t) \quad (1)$$

The capacitance (C) of the liquifier system may be defined as the change in fluid volume ($\Delta V$) per change in pressure ($\Delta P$), or:

$$C = \frac{\Delta V}{\Delta P} \quad (2)$$

The resistance (R) of the liquifier system may be defined as the change in pressure ($\Delta P$) per change in output flow rate ($\Delta Qo$), or:

$$R = \frac{\Delta P}{\Delta Qo} \quad (3)$$

Rearranging equation (2) yields:

$$\Delta P = \frac{\Delta V}{C} \quad (4)$$

Substituting $\Delta V$ from equation (1) and dividing both sides by $\Delta t$ yields:

$$\frac{\Delta P}{\Delta t} = \frac{(Qi - Qo)}{C} \quad (5)$$

Substituting ΔP from equation (3) and rearranging the resulting equation yields:

$$\frac{\Delta Qo}{\Delta t} = \frac{(Qi - Qo)}{R * C} \quad (6)$$

Defining a time constant of the liquifier system (τ=R*C) yields:

$$\frac{\Delta Qo}{\Delta t} = \frac{(Qi - Qo)}{\tau} \quad (7)$$

Taking the limit as Δt approaches zero yields the differential equation defining the performance of the liquifier system, which is:

$$\frac{dQo}{dt} = \frac{(Qi - Qo)}{\tau} \quad (8)$$

In accordance with the present invention, this governing equation (8) is utilized to calculate the input flow rate (Qi) required to produce a desired output flow rate (Qo). The present invention controls the output flow rate (Qo) at any point in time to be proportional to the x-y velocity of the extrusion head by a factor of the extruded bead's cross-sectional area (A), thereby producing a constant bead width of extruded modeling material. The present invention therefore allows the x-y velocity of the extrusion bead to be optimized as a function of time without regard to the flow response of the liquifier. An extrusion head velocity profile is determined based on the shapes of portions of the tool path followed by the head. This profile can be determined by any of a number of methods known in the art, including the method disclosed in U.S. Pat. No. 6,028,410 to Leavitt et al., which is assigned to Stratasys Inc, the assignee of the present invention. The extrusion head control system receives the extrusion head velocity profile and the extrusion head is allowed to accelerate and decelerate along the tool path poly-line to achieve maximum throughput, with the output flow rate (Qo) of modeling material being controlled to be proportional to the extrusion head velocity profile.

Solving equation (8) above for the input flow rate (Qi), substituting Qo=A*Vxy and rearranging the result, yields an equation for calculating the input flow rate (Qi) according to the present invention:

$$Qi = A * \left( Vxy + \tau \left( \frac{dVxy}{dt} \right) \right), \text{ or} \quad (9a)$$

$$Qi = A * (Vxy + (\tau * Axy)) \quad (9b)$$

where Axy is the x-y acceleration of the extrusion head.

For a known (controlled) extrusion head velocity (Vxy) and acceleration (Axy), the time constant (τ) of the system is the only unknown parameter in the input flow rate equation. The time constant, which is equal to the product of the resistance and the capacitance of the system, can be evaluated by experimentation or calculation. The following analysis illustrates calculation of the time constant.

Equation (2) above may be rewritten as follows:

$$C = \frac{V_L}{B} \quad (10)$$

where B is the bulk modulus of the modeling material employed by the system, defined as:

$$B = \frac{\Delta P}{\Delta V / V_L} \quad (11)$$

and $V_L$ represents the volume of the liquifier 26. The behavior of modeling materials under pressure may be obtained from documented experimentation and applied to determine the bulk modulus (B) of the material. For example, the specific volume of ABS thermoplastic at 250° C. changes from a value of 1.07 cubic centimeters per gram at atmospheric pressure to a value of 1.04 cubic centimeters per gram at 400 bar (5880 pounds per square inch (psi)). With these values the bulk modulus of ABS thermoplastic is given as:

$$B = \frac{5880}{(1.07 - 1.04)/1.04} = 210,000 \text{ psi} \quad (12)$$

An exemplary liquifier 26 is a 0.075 inch diameter (0.0375 inch radius) tube that is approximately 2 inches long. Therefore:

$$V_L = \pi r^2 h = (p)(0.0375)^2(2) = 0.0088 \text{ in}^3 \quad (13)$$

Inserting this parameter into equation (10) yields:

$$C = \frac{V_L}{B} = \frac{0.0088}{210,000} = 41.9 * 10^{-9} \text{ in}^3/\text{psi} \quad (14)$$

The flow resistance (R) of an exemplary liquifier 26 may be evaluated experimentally. Experiments performed on a 2 inch long liquifier tube running at a flow rate of $2000*10^{-6}$ cubic inches per second (in³/sec) show that 5.5 pounds-force (lbf) of filament force are required to maintain that flow rate. This situation yields a feed pressure of 1430 psi for 0.070 inch diameter filament. As a result, the resistance of the system may be calculated as follows:

$$R = \frac{P}{Qo} = \frac{1430}{2000*10^{-6}} = 715,000 \text{ psi/in}^3/\text{sec} \quad (15)$$

Multiplying the determined values of resistance (R) and capacitance (C) to evaluate the time constant (τ) yields:

$$\tau = R*C = 715,000*(41.9*10^{-9}) = 0.030 \text{ sec} \quad (16)$$

This value of the time constant of the system is quite close (within 10%) to the values yielded by experimentation on a Stratasys® FDM three-dimensional modeling machine. Small changes in the time constant are expected due to the complex thermal distribution within the liquifiers, as well as the complex behavior of thermoplastic materials. In actual use, the value of τ employed in the governing equation of the system will be adjusted slightly in order to yield the most consistent bead widths on actual test parts and machines.

Implementation of the Invention

In order to effectively implement the system of the present invention, it is preferable in an exemplary embodiment to impose certain guidelines on the x-y velocity and acceleration commands for moving the extrusion head, so as to avoid requiring the liquifier to make step changes in its input flow rate (which would place considerable limits on the liquifier pump design). Specifically, an exemplary embodiment of the present invention uses only continuous acceleration profiles for controlling the extrusion head. A continuous acceleration profile is a profile that does not have any step changes in acceleration. Using only continuous acceleration profiles eliminates trapezoidal velocity profiles for the extrusion head, which have step changes of acceleration that would require the liquifier pump to make step changes in input flow rate while starting, stopping or transitioning from acceleration to deceleration of the extrusion head. In such a system, maximum x-y velocities for the extrusion head are determined based on the shapes of portions of the tool path, and continuous accelerations and decelerations are determined so that changes in the x-y velocity of the extrusion head are gradual in nature.

High order velocity profiles are required in order to produce a smooth velocity profile with a continuous acceleration profile. One fairly common type of profile used in motion profiling systems to smooth velocities is an S-profile. The velocity is smoothed in an S-profile by ramping the commanded acceleration along a trapezoidal profile. An exemplary embodiment of the present invention will be described below with respect to S-profile commands for moving the extrusion head. It should be understood, however, that the present invention may also employ other velocity smoothing techniques known in the art such as sinusoidal or cycloidal profiling, velocity averaging or exponential smoothing, for example.

Figure 3:
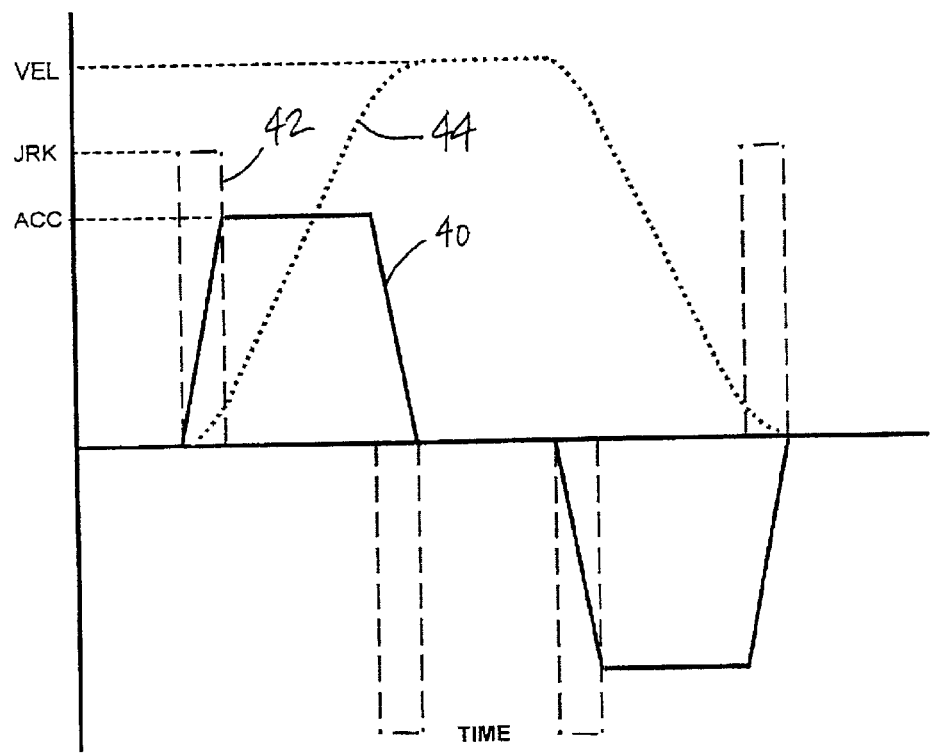
FIG. 3 is a graphical representation of an extrusion head velocity profile, acceleration profile and jerk profile for achieving S-profiling in accordance with the present invention.

FIG. 3 is a graph illustrating S-profiling as a velocity smoothing technique employed by the present invention. The commanded x-y acceleration of the extrusion head is trapezoidal, as shown by an acceleration profile 40. The portions of the acceleration profile 40 having changing acceleration are described by a jerk profile 42, which is the derivative (slope) of the acceleration profile 40. The jerk profile 42 has a series of constant, finite jerk terms. The acceleration profile 40 produces an extrusion head velocity profile 44, which is generally "S-shaped." The gradual increases and decreases of the velocity profile 44 allow a relatively conventional liquifier pump to produce an output flow rate that continuously matches the x-y velocity of the extrusion head. In an exemplary embodiment, the jerk terms of the jerk profile 42 are required to have an absolute value below a predetermined threshold based on the capacitance of the liquifier system, to ensure that the extrusion head velocity profile is sufficiently smooth for the liquifier to continuously produce an output flow rate that matches the x-y velocity of the extrusion head.

Figure 4:
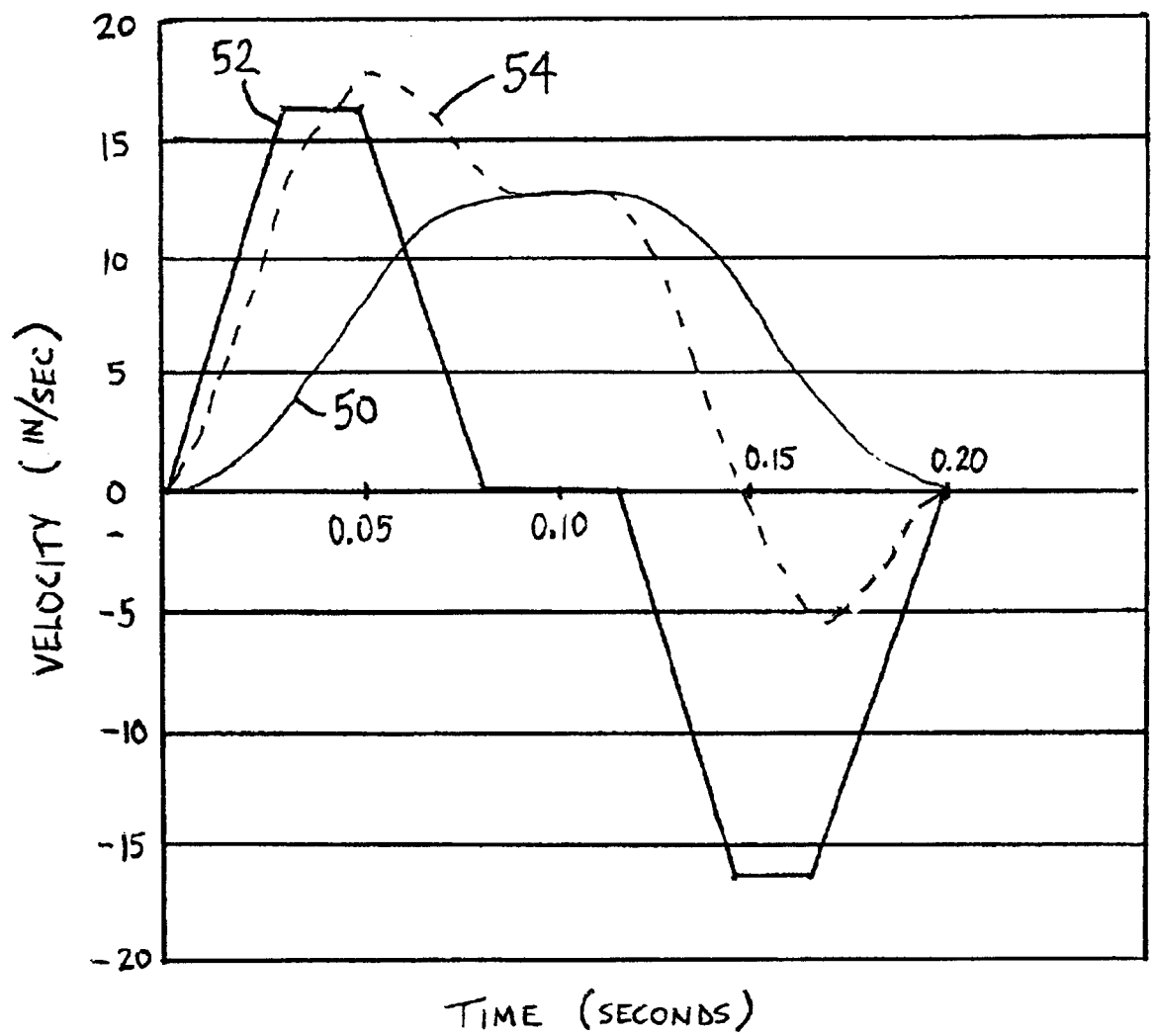
FIG. 4 is a graphical representation of an extrusion head velocity profile, an acceleration profile and a liquifier input rate achieved in operation of an exemplary embodiment of the present invention.

FIG. 4 is a graph illustrating an exemplary extrusion head velocity 50, extrusion head acceleration 52 and liquifier input rate 54 according to the present invention. For ease of illustration, the output rate of the liquifier has been normalized to have the same velocity units as the x-y velocity of the extrusion head, by assuming a dimensionless bead area (A) of 1. It should be noted that at each point on the graph of FIG. 4, the input rate of the liquifier is equal to the x-y velocity of the extrusion head plus a time constant (τ) times the current acceleration value of the extrusion head (Axy). The difference in area between the liquifier pump velocity curve and the x-y velocity curve of the extrusion head represents the distance that the liquifier filament is compressed to achieve the desired liquifier pressure and output flow rate.

In an exemplary embodiment, the liquifier control method of the present invention is implemented on three-dimensional modeling machines that include melt flow compensation capability as described in U.S. application Ser. No. 09/960,133 filed Sep. 21, 2001 for "Melt Flow Compensation In An Extrusion Apparatus" by James W. Comb. The aforementioned Ser. No. 09/960,133 application is hereby incorporated by reference in its entirety. Melt flow compensation is based on the premise that at higher flow rates of filament into a liquifier, more of the liquifier contains solid modeling material (as opposed to melted liquid modeling material) than at lower flow rates of filament into the liquifier. If the input flow rate of the filament were to decrease from a high flow rate to a low flow rate, the amount of liquid in the liquifier would increase and the output flow rate (Qo) would include a melt flow component ($Q_{MFL}$) that is compensated for by a downward adjustment of the commanded input flow rate of the filament. The melt flow relationship is generally given by:

$$Q_{MFL} = \%_{MF} * Q_M \quad (17)$$

where $\%_{MF}$ is the percent expansion of the modeling material during melting, $Q_M$ is the rate at which the solid filament melts, and $Q_{MFL}$ is the output flow rate of liquid modeling material due to melting. Melt flow compensation models the output flow rate from the liquifier (Qo) as the sum of the rate that filament is fed into the liquifier (Qi) and the melt flow component ($Q_{MFL}$).

The present invention, which operates to determine (and control) the output flow rate from the liquifier based on the input flow rate in terms of a governing differential equation, can be readily incorporated into a melt flow compensation system. Melt flow compensation systems, as disclosed in detail in the aforementioned application Ser. No. 09/960,133, operate to determine a commanded input flow rate that is required to achieve a target flow rate based on melt flow parameters. The principles of the present invention can be employed in these systems by recognizing that the target flow rate ($Q_{Target}$) is defined by the equation:

$$Q_{Target} = A * (Vxy + \tau * Axy) \quad (18)$$

Substituting this relationship into the melt flow compensation system gives a commanded input flow rate that is based on melt flow compensation parameters and the velocity and acceleration of the extrusion head.

The present invention therefore provides a liquifier pump control system and method in an extrusion apparatus in which the output flow rate of the liquifier is controlled as a function of an x-y velocity of the extrusion head, which is based on the tool path followed by the extrusion head. The output flow rate of the liquifier is related to the input rate at which filament is fed to the liquifier by a differential equation, enabling the output flow rate of the liquifier to be controlled by controlling the input rate of the filament. The output flow rate may be rapidly increased by feeding filament to the liquifier at a high rate, which increases the pressure in the liquifier and therefore increases the flow rate of melted modeling material out of the liquifier. The output flow rate may be rapidly decreased by actually pulling filament out of the liquifier, which decreases the pressure in the liquifier and therefore decreases the flow rate of melted modeling material out of the liquifier.

As a result of the present invention, the x-y velocity oft he extrusion head may be optimized as a function of time, based only on the shapes of portions of the tool path followed by the head. In other words, the extrusion head is allowed to accelerate and decelerate along the tool path poly-line without regard to the flow response oft he liquifier. The present invention controls the output flow rate of the liquifier at any point in time to be proportional to the x-y velocity of the extrusion head, in order to produce consistent bead sizes of modeling material.

It should be understood by those skilled in the art that the above discussion describes determining the extrusion head velocity profile based on the tool paths and lumped parameters that account for physical processes in the extrusion head. To the extent that those parameters are themselves found to be dependent on other parameters such as the recent flow history of the extrusion head, a look-up table or fitted function can be used to supply the lumped parameters appropriate to the instantaneous extrusion conditions.

Although the present invention has been described with reference to preferred embodiments, workers skilled in the art will recognize that changes may be made in form and detail without departing from the spirit and scope of the invention. For example, the present description focuses on three-dimensional modeling applications, but it should be understood that the melt flow compensation of the present invention is applicable in other types of extrusion systems that seek to achieve a predetermined extrusion profile. Other fields in which the present invention can be applied include adhesive dispensing applications (e.g., assembly of cars, diapers, boxes and clothing) and solder paste extrusion (used, for example, in fabrication of circuit boards).

What is claimed is:

1. In an extrusion apparatus having an extrusion head including a liquifier which receives a solid element of a modeling material, heats the modeling material, and outputs a flow of the modeling material at an output flow rate while the extrusion head moves along a predetermined tool path at an extrusion head velocity, the apparatus using a material advance mechanism to supply the solid element of modeling material to the liquifier at an input rate which controls the output flow rate, a method for controlling the output flow rate comprising:
   determining an extrusion head velocity profile based on the tool path; and
   controlling the input rate of modeling material to the liquifier to produce an output flow rate of modeling material from the liquifier that is proportional to a current extrusion head velocity corresponding to the extrusion head velocity profile.

2. The method of claim 1, wherein determining the extrusion head velocity profile comprises:
   determining maximum extrusion head velocities for portions of the tool path based on shapes of the portions of the tool path; and
   determining extrusion head accelerations and decelerations that are continuous.

3. The method of claim 2, wherein the extrusion head accelerations and decelerations have constant finite jerk terms.

4. The method of claim 2, wherein the extrusion head accelerations and decelerations have jerk terms with an absolute value below a predetermined threshold based on a capacitance of the liquifier.

5. The method of claim 1, wherein the extrusion head velocity profile is an S-profile.

6. In an extrusion apparatus having an extrusion head including a liquifier which receives a solid element of a modeling material, heats the modeling material, and outputs a flow of the modeling material at an output flow rate while the extrusion head moves along a predetermined tool path at an extrusion head velocity, the apparatus using a material advance mechanism to supply the solid element of modeling material to the liquifier at an input rate which controls the output flow rate, a method of controlling the output flow rate comprising:
   determining an extrusion head velocity profile and an extrusion head acceleration profile based on the tool path;
   calculating the input rate of modeling material to the liquifier required to achieve an output flow rate of modeling material from the liquifier that is proportional to a current extrusion head velocity corresponding to the extrusion head velocity profile, the input rate being calculated based on the extrusion head velocity profile, the extrusion head acceleration profile and a time constant; and
   controlling the input rate of modeling material to equal the calculated input rate.

7. The method of claim 6, wherein calculating the input rate of modeling material to the liquifier comprises solving a differential equation that governs the performance of the liquifier.

8. The method of claim 7, wherein the differential equation is:

$$Qi = A*(Vxy + (\tau*Axy))$$

where Qi is the input rate, A is a cross-sectional area of a bead of extruded modeling material, Vxy is the extrusion head velocity, $\tau$ is the time constant, and Axy is the extrusion head acceleration.

9. The method of claim 6, wherein determining the extrusion head velocity profile comprises:
   determining maximum extrusion head velocities for portions of the tool path based on shapes of the portions of the tool path; and
   determining extrusion head accelerations and decelerations that are continuous.

10. The method of claim 9, wherein the extrusion head accelerations and decelerations have constant finite jerk terms.

11. The method of claim 9, wherein the extrusion head accelerations and decelerations have jerk terms with an absolute value below a predetermined threshold based on a capacitance of the liquifier.

12. The method of claim 6, wherein the extrusion head velocity profile is an S-profile.

13. An extrusion apparatus comprising:
   an extrusion head movable along a predetermined tool path at an extrusion head velocity;
   a liquifier carried by the extrusion head which receives a solid element of a modeling material, heats the modeling material, and outputs a flow of the modeling material at an output flow rate;
   a material advance mechanism which supplies the solid element of modeling material to the liquifier at an input rate that controls the output flow rate;
   a modeling system for determining an extrusion head velocity profile based on the tool path; and
   a control system for providing control signals to the material advance mechanism, the control signals commanding operation of the material advance mechanism to have an input rate of modeling material to the liquifier that produces an output flow rate of modeling material from the liquifier that is proportional to a current extrusion head velocity corresponding to the extrusion head velocity profile.

14. The apparatus of claim 13, wherein the modeling system is operable to determine maximum extrusion head velocities for portions of the tool path based on shapes of the portions of the tool path, and to determine extrusion head accelerations and decelerations that are continuous.

15. The apparatus of claim 14, wherein the extrusion head accelerations and decelerations have constant finite jerk terms.

16. The apparatus of claim 14, wherein the extrusion head accelerations and decelerations have jerk terms with an absolute value below a predetermined threshold based on a capacitance of the liquifier.

17. The apparatus of claim 13, wherein the modeling system is operable to determine an S-profile for the extrusion head velocity profile.

18. The apparatus of claim 13, wherein the control system is operable to calculate the input rate of modeling material to the liquefier required to achieve the output flow rate of modeling material from the liquifier that is proportional to a current extrusion head velocity corresponding to the extrusion head velocity profile based on the current extrusion head velocity, a current extrusion head acceleration and a time constant.

19. The apparatus of claim 18, wherein the input rate of modeling material to the liquifier is calculated by the control system by solving a differential equation that governs the performance of the liquifier.

20. The apparatus of claim 19, wherein the differential equation is:

$$Qi = A^*(Vxy + (\tau^* Axy))$$

where Qi is the input rate, A is a cross-sectional area of a bead of extruded modeling material, Vxy is the current extrusion head velocity, $\tau$ is the time constant, and Axy is the current extrusion head acceleration.

21. In an extrusion apparatus having an extrusion head including a liquifier which receives a solid element of a modeling material, heats the modeling material, and outputs a flow of the modeling material at an output flow rate while the extrusion head moves along a predetermined tool path at an extrusion head velocity, the apparatus using a material advance mechanism to supply the solid element of modeling material to the liquifier at an input rate which controls the output flow rate, a method for controlling the output flow rate comprising:

receiving a predetermined extrusion head velocity profile based on the tool path; and controlling the input rate of modeling material to the liquifier to produce an output flow rate of modeling material from the liquifier that is proportional to a current extrusion head velocity corresponding to the extrusion head velocity profile.

22. The method of claim 21, wherein the extrusion head velocity profile has accelerations and decelerations that are continuous.

23. The method of claim 22, wherein the extrusion head velocity profile is an S-profile.

24. An extrusion apparatus comprising:

an extrusion head movable along a predetermined tool path at an extrusion head velocity;

a liquifier carried by the extrusion head which receives a solid element of a modeling material, heats the modeling material, and outputs a flow of the modeling material at an output flow rate;

a material advance mechanism which supplies the solid element of modeling material to the liquifier at an input rate that controls the output flow rate; and a control system for providing control signals to the material advance mechanism, the control signals commanding operation of the material advance mechanism to have an input rate of modeling material to the liquifier that produces an output flow rate of modeling material from the liquifier that is proportional to a current extrusion head velocity corresponding to an extrusion head velocity profile based on the tool path.

25. The apparatus of claim 24, wherein the extrusion head velocity profile has accelerations and decelerations that are continuous.

26. The apparatus of claim 25, wherein the extrusion head velocity profile is an S-profile.

27. The apparatus of claim 24, wherein the control system is operable to calculate the input rate of modeling material to the liquifier required to achieve the output flow rate of modeling material from the liquifier that is proportional to a current extrusion head velocity corresponding to the extrusion head velocity profile based on the current extrusion head velocity, a current extrusion head acceleration and a time constant.

28. The apparatus of claim 27, wherein the input rate of modeling material to the liquifier is calculated by the control system by solving a differential equation that governs the performance of the liquifier.

29. The apparatus of claim 28, wherein the differential equation is:

$$Qi = A^*(Vxy + (\tau^* Axy))$$

where Qi is the rate, A is a cross-sectional area of a bead of extruded modeling material, Vxy is the current extrusion head velocity, $\tau$ is the time constant, and Axy is the current extrusion head acceleration.

* * * * *

UNITED STATES PATENT AND TRADEMARK OFFICE
CERTIFICATE OF CORRECTION

PATENT NO. : 6,814,907 B1
DATED : November 9, 2004
INVENTOR(S) : James W. Comb

It is certified that error appears in the above-identified patent and that said Letters Patent is hereby corrected as shown below:

Column 3,
Line 17, delete "oft he", insert -- of the --

Column 5,
Line 36, delete "bead", insert -- head --
Line 67, delete "oft he", insert -- of the --

Column 6,
Equation 15, delete "psi/in$^3$/sec", insert -- psi/(in$^3$/sec) --

Column 8,
Line 35, delete "application Ser.", insert -- Application --
Line 64, delete "oft he", insert -- of the --

Signed and Sealed this

Fifth Day of April, 2005

JON W. DUDAS
*Director of the United States Patent and Trademark Office*